No. 853,213. PATENTED MAY 14, 1907.
F. M. ASHLEY.
INKSTAND.
APPLICATION FILED APR. 20, 1906.
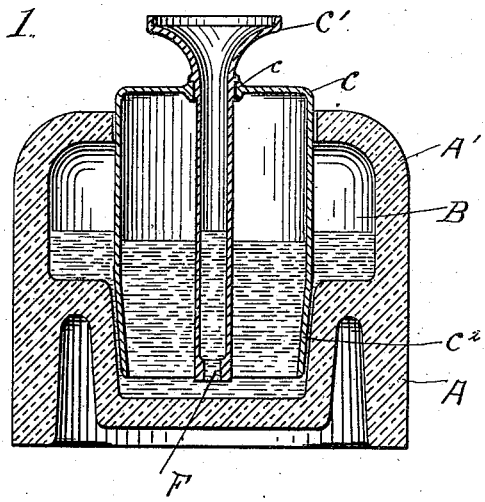
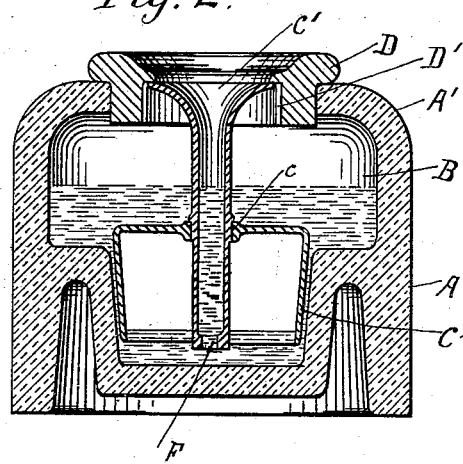
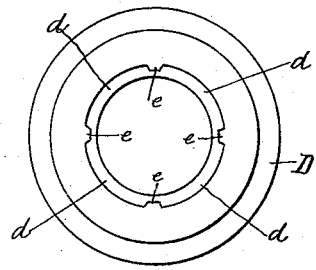
Witnesses
Inventor
Frank M. Ashley

UNITED STATES PATENT OFFICE.

FRANK M. ASHLEY, OF NEW YORK, N. Y.

INKSTAND.

No. 853,213.      Specification of Letters Patent.      Patented May 14, 1907.

Application filed April 20, 1906. Serial No. 312,752.

*To all whom it may concern:*

Be it known that I, FRANK M. ASHLEY, a citizen of the United States, and a resident of New York city, in the county of New York and State of New York, have invented certain new and useful Improvements in Inkstands, of which the following is a specification.

My invention relates to inkstands of the automatic type and the object of the invention is to provide an inkstand of this type which is very simple in construction and in which the parts are more easy to make.

The particular features of novelty will be pointed out in the claims hereinafter, and described in the following specification.

Figure 1, is a vertical sectional view of one form of my improved inkstand and Fig. 2, is a second form thereof, also shown in vertical section. Fig. 3, is an inverted view of the cap piece.

In Fig. 1, I show the inkstand made with a float which extends above the top of the body portion and in this type it is necessary when making a stand of considerable depth and capacity, to adjust the height of the float in the reservoir to prevent the float from standing too high in the stand when the reservoir is full of ink.

In Fig. 2, I show the float with the top of the dip tube located below the top of the stand, and in this case I do not need to adjust the height of the float in the stand since the same cannot float above the top of the stand due to the restraining cap piece.

The feature common to both styles is the form of the lower end of the float and the lower end of the reservoir in which the float is moved in operating the stand. Heretofore in making these types of stands, the lower or auxiliary reservoir has been made with the side walls thereof approximately parallel to each other or practically cylindrical in form, and this form has been hard to make in pressed glass, which is what most stands of this type are made from, due to the trouble in withdrawing the plunger from the glass when the glass is in a molten condition, without destroying the shape of the lower reservoir. I have therefore made the lower reservoir of conical form, which allows the plunger to withdraw easily from the glass in the pressing operation, thus allowing more bases to be made in a given time and reducing the number of bad bases which have to be thrown out since they cannot be used if not properly formed, and therefore the cost of the bases have been correspondingly reduced. By making the lower end of the float also with tapering sides to approximately correspond to the taper of the walls of the lower reservoir, I accomplish a very useful and decided advantage over all constructions of inkstands of this type heretofore made.

Referring to the drawings, A indicates the base or body portion having therein a reservoir B, the lower end of which is tapered to allow the plunger to easily withdraw therefrom in pressing, and also serves to assist in bringing up the ink in a proper manner to the dip cup of the float, when the float is depressed therein.

Referring to Fig. 1, the float C is made in two parts, the dip tube C' being made separate from the large cylindrical part on which it is mounted, and being connected thereto by a friction joint at $c$. The lower end of the cylindrical part, indicated by $C^2$ is tapered so that when the float is depressed to the bottom of the reservoir, the walls of the float and reservoir will almost touch each other, but are prevented from touching by the extension of the lower end of the dip tube, which contacts with the bottom of the reservoir when the float is in its lowest position, and thus prevents the float from wedging in the reservoir. The top of the stand A' is turned inward to act as a guide for the movement of the float. The reservoir above the tapered portion may be extended laterally to add ink capacity if desired.

Referring to Fig. 2, the joint $c$ is located lower on the float as shown, and a separate cap piece D is located on the top of the reservoir, and is provided with a guide-way D' in which is located grooves $d$—$d$—$d$—$d$ formed by projections $e$—$e$—$e$—$e$ which serve as the guides for the upper end of the float, the grooves serving to allow the air to escape from the reservoir during the movement of the float, and also serving to allow any overflow of ink from the dip cup, to flow back into the reservoir, should such an accident occur.

When the float is in its normal floating position, an annular passage is formed between the outer surface of the lower end of the float and the inner surface of the lower end of the reservoir, and as the float is depressed, this passage is correspondingly restricted.

Making the float in two parts serves to allow the parts to be more easily manufactured and in Fig. 1, the height of the float in the reservoir is governed by removing the dip tube C' from the large cylinder when the stand is filled, thus allowing the air in the float to escape while the float is being inserted in the reservoir, thus allowing the ink to flow upward in the float to the same height that it stands in the outer reservoir, when the dip tube is inserted in the cylinder, and by lifting the cylinder a short distance, a portion of the ink will flow out of the float into the reservoir, and air will be drawn in the float in place thereof, and the float will then stand at a proper height to bring up the ink to the dip cup when depressed.

In Fig. 2, I do not need to adjust the float, since it will always float upward so long as there is sufficient ink in the stand to buoy the same.

In filling the stand shown in Fig. 2, the cap-piece D is removed and the float also removed, and ink is poured into the reservoir until the same is about half filled, then the float is inserted, the air being trapped in the bell thereof, and the cap piece D replaced, the ink being forced upward in the reservoir and nearly filling the stand due to the displacement of the float.

In operation, the float on being depressed will move downward and the passage between the float and the wall of the reservoir will be restricted gradually, and the ink forced upward from the bottom of the reservoir to the dip cup. This movement and the gradual contraction of the passage serves to prevent the ink from spurting when the cup is depressed since the ink is not trapped so quickly as has heretofore been the custom, and a part of the ink is free to flow from the lower end of the reservoir to the upper part thereof when the float first begins to move, as will be easily understood. The lower end of the dip tube may be contracted as shown at F if desired, to further prevent the ink from spurting when the float is very quickly depressed, which is the only time that any excess of ink or spurting, is likely to occur.

Having thus described my invention, what I claim as new and desire to secure by Letters Patent is:

1. An inkstand having a reservoir with an extended tapering wall, and a float vertically movable therein and co-operative therewith to force ink to the upper end thereof as described.

2. An inkstand having a reservoir with a tapering wall, a float movable therein and forming a passage between said wall and float, thereby gradually restricting said passage by the movement of the float for the purpose set forth.

3. An inkstand having a reservoir with a tapering wall, and a float having a tapering wall, the downward movement of said float serving to lessen the distance between said walls and to upwardly force ink from said reservoir.

4. An inkstand having a reservoir with a tapering wall, a float vertically movable therein and co-operating with said wall to force ink upward therefrom, and means for restricting the upward movement of the float.

5. An inkstand having a reservoir with a tapering wall, a float movable therein, the lower end of which is provided with a tapering wall whereby a passage is formed between said walls, and means for restricting the upward movement of said float.

6. An inkstand having a main reservoir and a lower reservoir of reduced diameter, a float having its lower end tapered and located in said lower reservoir and having its lower end of less diameter than that of said lower reservoir when in their normal position relative to each other, thereby forming a passage between them, the downward movement of said float serving to restrict said passage.

7. An inkstand having a reservoir in its bottom, a float comprising two parts separably connected, the lower end of said float being in proximity to the lateral wall of said reservoir and having its wall tapered as set forth.

8. In an inkstand a reservoir having a tapering wall at its lower end, a float having a tapering wall at its lower end, said tapered part of the reservoir being disposed opposite the tapered part of the float, a cap-piece provided with a guide-way, and means for restricting the upward movement of the float.

9. An inkstand having a reservoir with a tapering wall, a float having a dip tube and a tapering wall, said tapered part of the reservoir being disposed opposite the tapered part of the float, said float having the lower end of the dip tube extending below the remainder of the float.

10. An inkstand having a reservoir with a tapering wall at its lower end, and a float made in two parts and having a tapering wall at its lower end and disposed opposite the tapered wall of said reservoir.

11. An inkstand having a reservoir with a tapering wall at its lower end, a float made in two parts and having a tapering wall at its lower end, and disposed opposite the tapered wall of said reservoir, and means for restricting the upward movement of said float.

12. An inkstand having a reservoir with its lower end tapered, and a float having its lower end disposed in proximity to the tapered wall of said reservoir and operative as described.

13. An inkstand comprising a body having a reservoir, a float in said reservoir of sufficiently less diameter to form a passage between the wall of said float and reservoir, the lower end of said float or reservoir being tapered so that the lowering of the float will restrict said passage and upwardly force the ink from the reservoir.

14. An inkstand having a main reservoir with a second reservoir in its bottom, a float having its lower end tapered and disposed in proximity to the lateral wall of said reservoir and operative as described.

15. An inkstand having a main reservoir with a second reservoir in its bottom, said second reservoir having its wall tapered, and a float having its lower end disposed in proximity to the tapered wall of said reservoir and operative as described.

16. An inkstand having a reservoir, and a float having its lower end tapered and disposed in proximity to the lateral wall of said reservoir and operative as described.

Signed at New York in the county of New York and State of New York this 18th day of April A. D. 1906.

FRANK M. ASHLEY.

Witnesses:
FRANK L. SEAVER,
A. T. SCHARPS.